Patented Apr. 26, 1938

2,115,418

UNITED STATES PATENT OFFICE 2,115,418

PANCREAS-DERIVED PRODUCT AND PROCESS OF PRODUCING IT

Lester R. Dragstedt, John Van Prohaska, and Herman P. Harms, Chicago, Ill.

No Drawing Application June 3, 1936, Serial No. 83,308

1 Claim. (Cl. 167—75)

Our invention relates to a pancreas-derived product which controls the metabolism of fat, and to the process of producing such product; and also to the control of the metabolism of fat by such product.

Such a product, possibly a hormone, prevents and relieves fatty degeneration and infiltration of the liver, such as tends to occur in diabetics, permits the diabetic to ingest the normal amount of fat in his diet, and gives promise of preventing and relieving arteriosclerosis and possibly also atherosclerosis.

The effect of insulin on parenteral administration in controlling the metabolism of carbohydrates is now well known. In pancreatic insufficiency in human beings, and in experimental animals which have been depancreatized, the metabolism of carbohydrates in the system can be adequately controlled by the parenteral administration of insulin.

But it has long been known that the control of carbohydrate metabolism is not in itself sufficient for health in experimental animals which have been completely depancreatized. Completely depancreatized dogs on normal diet, for instance, when adequately treated with present-day commercial insulin to control their carbohydrate metabolism, nevertheless usually die within two to three months after the removal of the pancreas if the treatment is with such insulin alone. Autopsies in such cases show that there has been extensive fatty infiltration and degeneration of the liver. This has been known substantially ever since the original discovery of insulin by Banting and his co-workers in the early 1920's.

It has also long been known that if the insulin treatment of such completely depancreatized dogs is augmented by the feeding of pancreas, the fatty infiltration and degeneration of the liver can be prevented; and that thereby the depancreatized dogs can be kept alive indefinitely. For instance, it has been known for a number of years that when adequate insulin treatment for the control of carbohydrate metabolism in completely depancreatized dogs weighing about 10 kilograms is augmented by the feeding of 100 grams of pancreas per day, the fatty infiltration and degeneration of the liver can be prevented and the dogs kept alive and healthy. Indeed, we find that not only can such fatty infiltration and degeneration of the liver be thus prevented, but that when it has occurred it can even be cured by adequate feeding of pancreas.

Thus it has been evident for years that the normal pancreas not only controls carbohydrate metabolism but also somehow exerts a control of the fat metabolism and prevents fatty infiltration and degeneration of the liver and probably also prevents arteriosclerosis by reason of that control of fat metabolism; and that not only that control of carbohydrate metabolism but also that control of fat metabolism is essential for health.

In the course of our investigation we have made the incidental finding that for completely depancreatized dogs of the weight mentioned (10 kg.) the feeding of pancreas to augment the insulin treatment need not be so great as 100 grams per day; but that 25 grams per day is sufficient, although 10 grams per day is probably insufficient.

It has been found by prior investigators that the feeding of about 10 grams of lecithin or of about 1.5 to 2.5 grams of choline per day, to augment the insulin treatment of depancreatized dogs, is at least partially successful in preventing the characteristic liver damage due to fat infiltration and in enabling the dogs to survive; although there is not full agreement as to the extent of that success. Because of that at least partial success, it has been suggested that it is the lecithin content of the pancreas, and perhaps even the choline in that lecithin, which is the substance in the pancreas that exerts the control of fat metabolism.

However, while it is true that lecithin and choline are present in fresh pancreas, the amount thereof ordinarily found in an adequate dose of whole pancreas is at most not more than one-tenth of the amount of lecithin or of choline that is required to exert this beneficial effect. That is, although 25 grams of whole pancreas is sufficient to prevent and even to cure fatty degeneration in the depancreatized dog, it requires at least as much lecithin or choline as is obtainable from 250 grams of pancreas to obtain this effect even partially.

In addition, we have been able to secure the full beneficial effect of the whole pancreas in preventing and curing fatty infiltration and degeneration of the liver by the use of a pancreas extract which is substantially free from both lecithin and choline.

Thus lecithin and choline are evidently not the substances in the pancreas which exert the natural control of fat metabolism.

It thus appears that the pancreas secretes something in addition to insulin, and something that is neither lecithin nor choline, which normally enters the system and which controls fat metabolism and prevents fatty infiltration and degeneration of the liver and perhaps prevents that fatty infiltration of arterial walls which is the forerunner of arteriosclerosis. We believe that that something is a specific hormone.

With that in view, we have obtained from the pancreas certain extracts which when orally administered exert a control of fat metabolism and prevent fatty infiltration and degeneration of the liver in completely depancreatized dogs. With our extracts we can not only prevent degenerative changes in the liver, but we can reverse the degenerative process and cause a return to normal of livers which have partially degenerated. We have shown this by the treatment of completely depancreatized dogs, in which the carbohydrate metabolism is controlled by the parenteral administration of insulin; and in which periods of feeding our pancreas extracts alternate with periods in which there is no such feeding, to produce alternating periods of control and lack of control of the fat metabolism. As shown by successive microscopic examinations of dissected portions of the liver, we have been able for as many as seven times over a period of months to cause the liver to degenerate and become infiltrated with fat and the animal to lose weight and appetite and vitality generally when no control of fat metabolism is applied, but to cause the liver to return to normal and the fatty infiltration to disappear and the depancreatized animal to regain its health very soon after the feeding of our pancreas extract is started or resumed.

Methods of preparing our pancreas extract are as follows:

Method A a. Fresh pancreas, conveniently beef pancreas, after being finely minced, is first extracted with about two volumes of 95% ethyl alcohol; to which may be added sufficient acid, conveniently sulphuric acid, to produce an acidity desirably as great as about pH 4. In making the extraction, the alcohol is allowed to stand on the pancreas for about 5 or 6 hours, with stirring, and is then removed by filtration or decantation. On account of water in the pancreas, this makes the effective alcohol concentration about 60%. If desired, the alcoholic extraction may be repeated two or three times, with either 60% alcohol or 95% alcohol.

b. The alcoholic filtrates, or the combined alcoholic filtrate if several alcoholic extractions are made, is evaporated to dryness in the cold, either under vacuum or by merely exposing the alcoholic filtrate in pans and blowing air over it.

c. The solid residue remaining from this evaporation is extracted several times with a fat solvent which is inert toward the active principle which controls fat metabolism, such for instance as ether; and the several extracts so obtained are discarded.

d. The residue remaining after ether extraction is effective as such to control fat metabolism when fed to depancreatized dogs. When desiccated, it usually has a weight of the order of 1.5% to 2.5% of the original pancreas. It is effective in daily oral doses of 750 mg. to 2500 mg., or the amount derived from 50 to 100 grams of original pancreas, to control the fat metabolism and to prevent and relieve fatty infiltration of the liver in the depancreatized dogs. It thus contains a substance which is of pancreas origin and which controls fat metabolism. In addition, it contains insulin from the pancreas; but that is incidental, because insulin requires parenteral administration.

Method B a. Step a can be carried out as in Method A.

b. Instead of evaporating the alcoholic filtrate to dryness, as in step b of Method A, the evaporation may be carried only to the point of driving off the alcohol, which leaves the active principle in solution in water but causes the fat to come out of solution. Such fat is separated from the solution, as by filtration, to leave a substantially fat-free aqueous filtrate containing the active principle.

c. If desired, this water extract may be evaporated to dryness, and the solid residue used as such to control fat metabolism. When desiccated, it has a weight about the same as that of the residue remaining from step c of Method A; which residue is discussed under d in Method A.

Method C.—Further purification a. If further purification is desired, it can be obtained of either the solid residue obtained by Method A or of the aqueous extract obtained at the end of step b of Method B. For such purification, an aqueous extract is used, so that if the solid residue obtained at the end of Method A is to be purified it is first taken up in water. The volume of the solution so obtained, or the volume of the aqueous solution obtained at the end of step b of Method B, is adjusted to contain approximately 10% solids. To this solution (or suspension) is added enough sodium chloride to produce approximate saturation; which causes a precipitate to form. This precipitate is separated, as by filtration; and is then dissolved or suspended in alcohol of sufficient quantity and concentration to make a final alcoholic concentration of approximately 90%. One to one and one-half volumes of ethyl ether are now added, which produces a precipitate that is then separated. This precipitate may be dried, and used as such by oral administration, to control fat metabolism.

b. The last-named precipitate may be purified still further, if it is desired to make it substantially insulin-free. To that end, it is taken up in water, and the hydrogen ion concentration of the water solution is adjusted to between pH 4 and pH 5.5; which is the range in which most of the insulin activity is insoluble, while at least much of the fat-metabolism-controlling principle is soluble. The solids are suitably separated from the liquid, as by filtration; and the liquid, which contains at least a large part of the fat-metabolism-controlling principle, is retained. Such liquid may be orally administered as such; but for convenience it is preferably evaporated to dryness, under vacuum if desired, and the residue thereby obtained is used for oral administration to control the metabolism of fats, for which it is very effective. Like the products of Methods A and B, it is found to be effective in daily oral doses of the amounts obtained from between 50 gms. and 100 gms. of original pancreas; but this final product usually has a weight of the order of less than 0.5% of the weight of the original pancreas.

The final products of Methods A, B, and C are thus all effective by oral administration to control fat metabolism, and to prevent and relieve fatty degeneration and infiltration of the liver in depancreatized dogs. In addition, the products of all three methods are soluble in 60% alcohol, insoluble in ether, insoluble in a mixture of equal volumes of ether and 90% alcohol, and are precipitated from water solution by saturation of such solution with sodium chloride. Moreover, the products of all three methods are substantially free from choline and from lecithin. Further, when the product of any of these three Methods A, B, and C is subjected to the action of the enzymes incident to digestion in the normal stomach, the fat-metabolism-controlling activity perists; and it is that persistance which permits the product to be effective on oral administration. The products of Methods A and B are not free from insulin, but contain at least the greater part of the insulin of the original pancreas; but the purified product of Method C contains relatively little, substantially less than 10%, of the insulin of the original pancreas, although it contains the greater part of the fat-metabolism-controlling principle of the original pancreas.

We claim as our invention:

A fat-metabolism-controlling pancreas-derived substance which is effective on oral administration to control fat metabolism and to prevent and relieve fatty degeneration and infiltration of the liver in depancreatized dogs; and which is soluble in 60% alcohol, insoluble in ether, insoluble in a mixture of equal volumes of ether and 90% alcohol, and substantially free from choline and from lecithin.

LESTER R. DRAGSTEDT.
JOHN VAN PROHASKA.
HERMAN P. HARMS.